United States Patent Office 2,695,911
Patented Nov. 30, 1954

2,695,911

PREPARATION OF COPPER COMPOUNDS OF THIOSEMICARBAZONES

Richard Kuhn and Friedrich Zilliken, Heidelberg, Germany, assignors to American Home Products Corporation, New York, N. Y., a corporation of Delaware No Drawing. Application August 14, 1951,
Serial No. 241,891

1 Claim. (Cl. 260—438)

This invention relates to the preparation of copper compounds of thiosemicarbazones.

It has been discovered that copper compounds of thiosemicarbazones are obtained if cuprous salts are allowed to react on thiosemicarbazones. The same copper compounds are also obtained, but in smaller yields, by the reaction of cupric salts on thiosemicarbazones.

The preparation of these copper compounds is most easily carried out by mixing a solution of a thiosemicarbazone, e. g. of p-substituted benzaldethiosemicarbazone, in an inert solvent, e. g. an alcohol, ether or ester, with an ammoniacal solution of a cuprous salt, e. g. of cuprous chloride; in case the reaction takes too long a time at ordinary temperature, the solution is warmed. The copper compounds of the thiosemicarbazones in general precipitate in very pure form from the reaction mixture and can be used immediately after filtration and washing.

The structure of these compounds is not known, as the nature of the secondary valences is obscure. The empirical formula may be expressed as $Cu \cdot R \cdot CH_3N_3S$, where R represents a group derived from the aldehyde by eliminating HO. Thus the formula for the copper compound of p-methoxybenzaldehydethiosemicarbazone is $Cu \cdot C_8H_7O \cdot CH_3N_3S$ or $Cu \cdot C_9H_{10}ON_3S$, and that for the copper compound of p-acetaminobenzaldehydethiosemicarbazones is $Cu \cdot C_9H_8ON \cdot CH_3N_3S$.

These copper compounds, like the free thiosemicarbazones, are adapted for use as therapeutic agents, for example in combating tuberculosis, but they have the advantage over the latter that they are in general found to be tasteless by the persons undergoing treatment, and are free of adverse reaction.

In the following examples the parts indicated are parts by weight.

Examples

1. To a solution of 10 parts of p-methoxybenzaldehydethiosemicarbazone in 200 parts of methanol boiling under a reflux condenser are added slowly 30 parts of an ammoniacal cuprous chloride solution, which contains 4.8 parts $Cu_2Cl_2$, and the mixture is heated a short time longer. The mixture is then cooled and the lemon-yellow precipitate of the copper compound of the thiosemicarbazone is filtered off, washed with water, alcohol and ether and dried in a vacuum at 100° C. The yield is 12.5 parts.

2. To a boiling solution of 10 parts p-acetaminobenzaldehydethiosemicarbazone in 400 parts of methanol are added 30 parts of the ammoniacal cuprous chloride solution of Example 1. The mixture is worked up as in Example 1, and 12.4 parts of the copper compound of p-acetaminobenzaldehydethiosemicarbazone are obtained as a lemon-yellow powder, somewhat soluble in acetone, more soluble in pyridine.

We claim:

The method of preparing a copper compound of a thiosemicarbazone containing a para-substituted benzaldehyde residue which comprises reacting a solution of a thiosemicarbazone containing a para-substituted benzaldehyde residue selected from the class consisting of para-methoxy- and para-acetaminobenzaldehyde residues in a low-molecular-weight oxygen-containing inert organic solvent with an ammoniacal solution of a cuprous salt at a temperature in the range from room temperature to refluxing temperature and filtering off the precipitated copper compound.

References Cited in the file of this patent

FOREIGN PATENTS

| Number | Country | Date |
|--------|---------|------|
| 76,219 | Germany | Oct. 28, 1943 |

OTHER REFERENCES

Behnisch et al. The American Review of Tuberculosis, vol. 61, January 1950, page 5.

Neuberg et al.: Ber., vol. 35 (1902), pages 2049 and 2050.

Mancorp et al.: Medizinische Klinik, Nov. 15, 1947, page 812.